United States Patent [19]

Saypalia, Jr.

[11] 3,910,490
[45] Oct. 7, 1975

[54] SOLAR ENERGY HEAT AND COOLING SYSTEM

[76] Inventor: William E. Saypalia, Jr., 143 Rockville Rd., Broad Brook, Conn. 06016

[22] Filed: Mar. 21, 1974

[21] Appl. No.: 453,400

[52] U.S. Cl. .................... 237/1 A; 126/271
[51] Int. Cl.² ................................ F24J 3/02
[58] Field of Search ............ 126/270, 271; 237/1 A

[56] References Cited
UNITED STATES PATENTS

| | | | |
|---|---|---|---|
| 2,396,338 | 3/1946 | Newton | 126/271 X |
| 2,469,496 | 5/1949 | Christenson | 126/271 X |
| 2,660,863 | 12/1953 | Gerhart, Jr. | 126/271 X |
| 2,693,939 | 11/1954 | Marchant et al. | 126/271 X |
| 3,179,105 | 4/1965 | Falbel | 126/271 |
| 3,254,703 | 6/1966 | Thomason | 126/271 X |
| 3,299,881 | 1/1967 | Koch | 126/271 |
| 3,450,192 | 6/1969 | Hay | 126/270 D X |
| 3,563,305 | 2/1971 | Hay | 126/270 |
| 3,599,626 | 8/1971 | Bouse | 126/271 |

Primary Examiner—William F. O'Dea
Assistant Examiner—Peter D. Ferguson

[57] ABSTRACT

A system installed in a private home so as to provide heat or coolness which is powered by solar energy, the system incorporating an above ground swimming pool, a collector and aluminum foil reflector which are struck by the sun's rays, water from the swimming pool circulating through the collector and back to the pool, the pool thus becoming warmed so to run through a hot water system of a house, the system additionally including reflector curtains, double layer glass air insulation, and other components.

7 Claims, 3 Drawing Figures

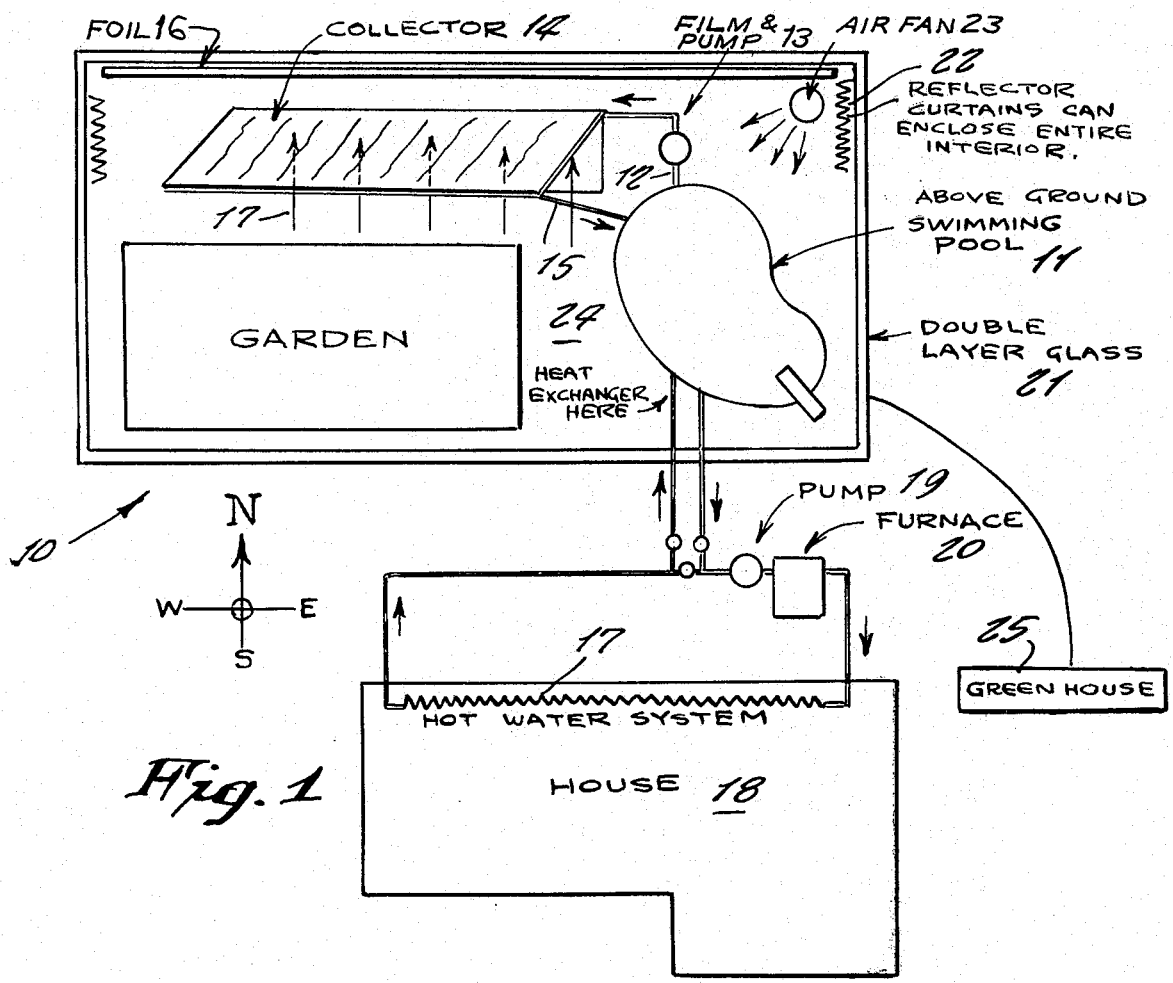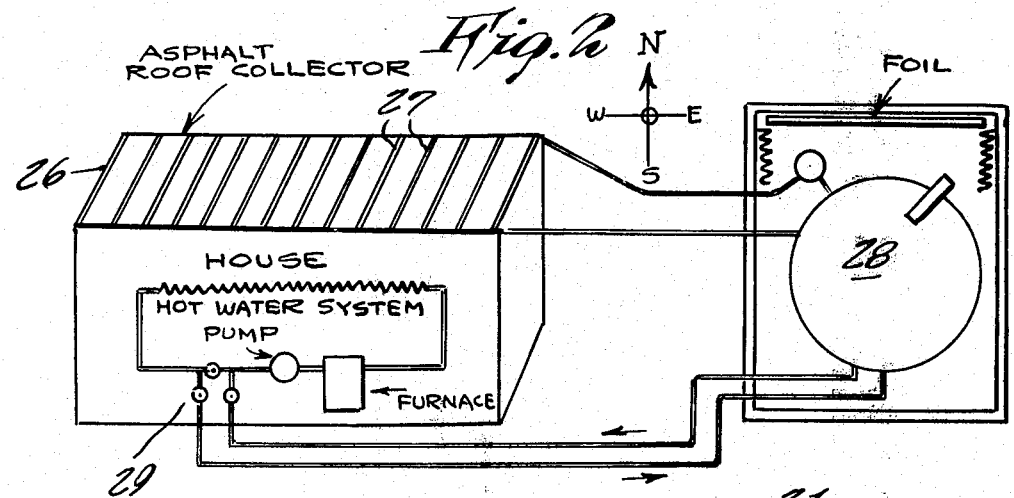

SOLAR ENERGY HEAT AND COOLING SYSTEM

This invention relates generally to house heating and cooling systems.

A principal object of the present invention is to provide a new type of heating and cooling system for a house which is powered by solar energy.

Another object of the present invention is to provide a solar energy heating and cooling system which does not develop any pollution to the atmosphere or the environment, and which is self operating.

Other objects of the present invention are to provide a solar energy heating and cooling system which is simple in design, inexpensive to manufacture, rugged in construction, easy to use and efficient in operation.

These and other objects will be readily evident upon a study of the following specification and the accompanying drawing, wherein:

FIG. 1 is a top plan view showing one design of the invention;

FIG. 2 is a top view of another design thereof;

FIG. 3 is a top view of still another design.

Referring now to the drawing in detail, and more particularly to FIG. 1 thereof at this time, the reference numeral 10 represents a solar energy heating and cooling system according to the present invention wherein the same includes an above ground swimming pool 11 from which swimming pool water is drawn through piping 12, through a filter and pump 13 and then through a collector 14. From there the water moves through piping 15 back into the swimming pool. In this form of the invention, the swimming pool and collector are exposed to the sun's rays. Additionally an aluminum foil reflector 16 is provided which also is exposed to the sun's rays, the sun's rays being shown at 17.

As the water is circulated through the collector 14 it is heated by the sun's rays. As a result the water re-entering the pool 11 becomes sufficiently heated so that it can be circulated through a hot water system 17 of a house 18. Such water is then caused to be passed through a pump 19 and the furnace 20 of the house 18.

As shown in FIG. 1, the entire heating equipment comprising the pool 11, collector 14 and foil reflector 16 are located behind a double layer glass 21 or a polyethylene plastic that is transparent. An air insulation is provided between the layers 21 so that the sun's rays enter the area without heat escaping therefrom.

Reflector curtains 22 are also provided adjacent the interior side of the double layer glass 21, the reflector curtains 22 being adaptable to be pulled out and thereby enclose the entire interior area surrounded by the double layer glass 21. A fan 23 is located within the interior 24 surrounded by double layer glass 21, the fan 23 serving to circulate air through out the interior.

As shown in FIG. 1, the example illustrated shows the collector 14 being positioned so that the sun's rays 17 come from the south in order that a maximum amount of rays can effect the collector 14. Alternately, the collector 14 can be placed on swivels so that the elevation thereof can be changed in order to follow the path of the sun as the seasons change.

If a garden is planted in the area shown in FIG. 1, pumps can be utilized to circulate water at night in the system to help with convection heating. In this case, the collector 14 functions in the manner of a radiator.

When the system 10 is intended for operation in summer time in order to cool the premises, the double layer glass wall 21 and curtains 22 are removed or rolled to the roof so as to leave the sides of the greenhouse 25 exposed to the air. The roof made of polyethylene which serves to cover the greenhouse 25 and the curtains 22 are left intact in order to act as a shade from the sun. A pump in the greenhouse 25 is utilized to circulate water from the pool 11 to the collector 14 at night. Evaporation of water from the surface of the pool 11 and from the collector 14 as well as exposure to the cooler night air functions to chill the water. The chilled water is pumped day and night as needed through the heating system 17 in the house 18 to cool the interior thereof. A dehumidifier is preferably installed in an appropriate place in the house 18 to remove water from sweating pipes and the radiators. In some locations, solar cooling and heating may be sufficient by itself.

Reference is now made to FIG. 2. This system takes advantage of the house having been constructed with a roof facing south. The polyethylene greenhouse is built and operated the same as in system 10 with the exception that the aluminum collector 14 is omitted. A dark asphalt roof shingle construction 26 is on the south side and acts as the collector. Studding 27 is placed on the roof as shown and covered with double layer polyethylene. In the winter, water is pumped from the pool 28 to the top of the roof and allowed to flow down over the sun warmed asphalt shingles and flows by gravity back into the pool 28. The sun's rays warm both the water in the pool 28 and that on the roof. The warm water in the pool 28 is circulated through the house as in the system 10 described above. In the summer the polyethylene on the roof is removed and the polyethylene greenhouse is utilized as in system 10. Circulating the water at night from the pool 28 to the roof and back cools the water in the pool 28. This water is then pumped through the house in substantially the same manner as described in system 10. Valves 29 near the furnace area can be used to control the path of flow of the water from the solar energy system to the furnace system in the manner as above described.

In FIG. 3, another system 30 is shown that has no flow of water and could be used to heat a garage or a storage shed. Most garages and storage sheds have concrete floors. Advantage can be taken of this construction by coating the concrete black so as to enable the latter to absorb the heat from the sun. The same type of greenhouse structure is constructed around the concrete as in the system 10, the pool and aluminum asphalt collectors however being omitted. Fifty-five gallon drums 31 are filled with water and are stacked near the north wall. The drums 31 are all coated black. The sun's rays heat the drums 31 of water both front and back. The heat is also stored in the concrete floor 32. At night or during periods of bad weather, the reflector curtains 33 are closed on both the roof and walls, so to conserve the heat. A fan 34 can be placed so as to facilitate convection heat flow.

Thus different designs of solar energy heating and cooling systems have been presented.

While various changes may be made in the details of construction, it is understood that such changes will be within the spirit and scope of the present invention as is defined by the appended claims.

What I now claim is:

1. A solar energy system having a first operating state and a second operating state and being operable for utilizing the energy of the sun's rays for purposes of assisting in effecting control over the temperature of the air in a building comprising:

a. a building embodying a primary temperature control system utilizing water as the heat exchange medium;

b. an enclosure located externally of said building, said enclosure including a multiplicity of removable side walls and a roof, at least one of said multiplicity of side walls being oriented so as to have the major surface thereof facing in a southerly direction, said multiplicity of side walls being joined together and to said roof when the solar energy system is in the first operating state thereof and said multiplicity of side walls being removed when the solar energy system is in the second operating state thereof thereby permitting in the second operating state thereof the free flow of air into said enclosure, said multiplicity of side walls and said roof each being formed of a transparent material operable to permit the sun's rays to pass therethrough;

c. a swimming pool containing water located within said multiplicity of side walls of said enclosure so as to be exposed to the sun's rays;

d. a collector mounted within said multiplicity of side walls of said enclosure so as to have at least one of the major surfaces thereof facing in a southerly direction, said collector comprising a closed structure operable to provide a fluid flow passage therethrough for water, said collector being formed of a transparent material operable to permit the sun's rays to pass therethrough;

e. an aluminum foil reflector supported within said multiplicity of side walls of said enclosure in parallel spaced relation to said one of said multiplicity of side walls and so as to be exposed to the sun's rays;

f. first conduit means operable to provide a closed fluid flow path for water between said swimming pool and said collector, said first conduit means including first pipe means, filter and pump means, second pipe means and third pipe means, said first pipe means having one end thereof connected in fluid flow relation with said swimming pool and the other end thereof connected in fluid flow relation with one side of said filter and pump means, said second pipe means having one end thereof connected in fluid flow relation with the other side of said filter and pump means and the other end thereof connected in fluid flow relation with one end of the fluid flow passage in said collector, said third pipe means having one end thereof connected in fluid flow relation with the other end of the fluid flow passage in said collector and the other end thereof connected in fluid flow relation with said swimming pool; and g. second conduit means operable to provide a closed fluid flow path for water between said swimming pool and said primary temperature control system in said building, said second conduit means comprising a pair of pipe means and a pair of valve means operable for controlling the flow of water through said pair of pipe means, one of said pair of pipe means and one of said pair of valve means being connected in series fluid flow relation with each other and having one end thereof connected in fluid flow relation with said swimming pool and the other end thereof connected in fluid flow relation with said primary temperature control system, the other of said pair of pipe means and the other of said pair of valve means being connected in series fluid flow relation with each other and having one end thereof connected in fluid flow relation with said swimming pool and the other end thereof connected in fluid flow relation with said primary temperature control system.

2. The solar energy system as set forth in claim 1 further comprising a multiplicity of reflector curtains mounted in juxtaposed relation to the interior surfaces of said multiplicity of side walls operable to enclose the interior of said enclosure.

3. The solar energy system as set forth in claim 2 wherein said enclosure comprises a greenhouse, said multiplicity of side walls are each formed of double-walled glass having a layer of air insulation therewithin, and said roof is formed of transparent polyethylene.

4. The solar energy system as set forth in claim 3 wherein said building comprises a dwelling.

5. The solar energy system as set forth in claim 4 wherein said primary temperature control system comprises a hot water heating system.

6. The solar energy system as set forth in claim 5 wherein the solar energy system when in the first operating state thereof functions as a heating system with water being pumped during the day from said swimming pool by said filter and pump means through said first and second pipe means to said collector, the water then being heated by the sun's rays as the water flows through the fluid flow passage in said collector, from said collector the heated water thereafter being caused to flow through said third pipe means to said swimming pool, after reentering said swimming pool the heated water being drawn through said one of said pair of pipe means and said one of said pair of valve means to said primary temperature control system whereupon the heated water is circulated through said primary temperature control system for purposes of assisting with said primary temperature control system to effect a heating of the interior of said dwelling, the water thereafter being returned to said swimming pool from said primary temperature control system through said other of said pipe means and said other of said valve means.

7. The solar energy system as set forth in claim 5 wherein the solar energy system when in the second operating state thereof functions as a cooling system, said reflector curtains in addition to said multiplicity of side walls being removed when the solar energy system is in the second operating state thereof and with the water being cooled as the water is circulated at night by said filter and pump means between said swimming pool and said collector through said first, second and third pipe means as a result of the evaporation of water from the surface of said swimming pool and during the flow of the water through the fluid flow passage in said collector, the cooled water upon return to said swimming pool being drawn therefrom as needed through said second conduit means and supplied to said primary temperature control system for circulation therethrough for purposes of effecting a cooling of the interior of said dwelling, the water thereafter being returned from said primary temperature control system to said swimming pool through said second conduit means.

\* \* \* \* \*